US010177391B2

(12) United States Patent
Matsumoto et al.

(10) Patent No.: US 10,177,391 B2
(45) Date of Patent: Jan. 8, 2019

(54) FUEL CELL SYSTEM FOR CALCULATING FUEL CELL TEMPERATURE BASED ON WATER CONTENT AND INTERNAL IMPEDANCE THEREOF, AND METHOD FOR CONTROLLING THE SAME

(75) Inventors: Michihiko Matsumoto, Fujisawa (JP); Kiyoshi Hoshi, Stuttgart (DE); Tetsuya Aoki, Yokosuka (JP)

(73) Assignee: NISSAN MOTOR CO., LTD., Yokohaha-shi (JP)

( * ) Notice: Subject to any disclaimer, the term of this patent is extended or adjusted under 35 U.S.C. 154(b) by 946 days.

(21) Appl. No.: 14/238,580

(22) PCT Filed: Aug. 10, 2012

(86) PCT No.: PCT/JP2012/070536
§ 371 (c)(1),
(2), (4) Date: Feb. 12, 2014

(87) PCT Pub. No.: WO2013/027612
PCT Pub. Date: Feb. 28, 2013

(65) Prior Publication Data
US 2014/0220470 A1    Aug. 7, 2014

(30) Foreign Application Priority Data
Aug. 22, 2011    (JP) .................................. 2011-180603

(51) Int. Cl.
*H01M 8/0432*    (2016.01)
*H01M 8/04492*    (2016.01)
(Continued)

(52) U.S. Cl.
CPC ..... *H01M 8/0432* (2013.01); *H01M 8/04358* (2013.01); *H01M 8/04492* (2013.01);
(Continued)

(58) Field of Classification Search
CPC .......... H01M 8/0432; H01M 8/04358; H01M 8/04492; H01M 8/04649; H01M 8/04641;
(Continued)

(56) References Cited

U.S. PATENT DOCUMENTS 5,925,476 A * 7/1999 Kawatsu ........... H01M 8/04089
429/424
8,524,406 B2 * 9/2013 Tanaka ................ B60L 11/1885
429/408
(Continued)

FOREIGN PATENT DOCUMENTS

JP    07-288136 A    10/1995
JP    2007-053854 A    3/2007
(Continued)

OTHER PUBLICATIONS

Office Action issued in Canadian Patent Application No. 2,845,702 dated Apr. 10, 2015.

*Primary Examiner* — Gary D Harris
(74) *Attorney, Agent, or Firm* — Foley & Lardner LLP

(57) ABSTRACT

A fuel cell system including a fuel cell that receives a supply of an anode gas and a cathode gas and generates power is provided. The fuel cell system includes a water content calculation unit configured to calculate a water content of the fuel cell, an internal impedance calculation unit configured to calculate an internal impedance of the fuel cell, and a starting temperature calculation unit configured to calculate a fuel cell temperature at a start of the system, based on the water content of the fuel cell as of a last time the system was stopped, and the internal impedance of the fuel cell at the start of the system.

11 Claims, 11 Drawing Sheets

(51) Int. Cl.
*H01M 8/04537* (2016.01)
*H01M 8/04701* (2016.01)

(52) U.S. Cl.
CPC ... *H01M 8/04641* (2013.01); *H01M 8/04649* (2013.01); *H01M 8/04701* (2013.01); *H01M 2250/20* (2013.01); *Y02T 90/32* (2013.01)

(58) Field of Classification Search
CPC .......... H01M 8/04701; H01M 2250/20; Y02T 90/32; Y02E 60/50
USPC ................................. 429/400, 450
See application file for complete search history.

(56) References Cited

U.S. PATENT DOCUMENTS

| | | | |
|---|---|---|---|
| 2006/0280977 A1* | 12/2006 | Sakajo ................ | B60L 11/1885 429/429 |
| 2007/0122668 A1* | 5/2007 | Suzuki .............. | H01M 8/04223 429/429 |
| 2012/0003557 A1* | 1/2012 | Tanaka ................ | B60L 11/1885 429/429 |
| 2012/0015270 A1* | 1/2012 | Naganuma ........ | H01M 8/04455 429/432 |

FOREIGN PATENT DOCUMENTS

| | | | | |
|---|---|---|---|---|
| JP | 2008-084601 A | 4/2008 | | |
| JP | 2007-173071 A | 8/2010 | | |
| JP | 2010-186599 A | 8/2010 | | |
| JP | WO 2010092871 A1 * | 8/2010 | .......... | B60L 11/1885 |

* cited by examiner

FUEL CELL SYSTEM FOR CALCULATING FUEL CELL TEMPERATURE BASED ON WATER CONTENT AND INTERNAL IMPEDANCE THEREOF, AND METHOD FOR CONTROLLING THE SAME

TECHNICAL FIELD

The present invention relates to a fuel cell system that supplies an anode gas and a cathode gas and allows a fuel cell to generate power.

BACKGROUND ART

JP2010-186599A discloses a fuel cell system that detects the cooling water temperature using a cooling water temperature sensor when the system is started, and uses the detected cooling water temperature as the fuel cell temperature at the start of the system.

SUMMARY OF INVENTION

When a fuel cell system is started below the freezing point, the water that is generated in the fuel cell freezes, the power generation performance of the fuel cell decreases, and so on, and therefore cases might occur where the vehicle is not allowed to drive until the power generating part in the fuel cell system warms up. Consequently, the fuel cell system judges whether to allow the vehicle to drive, using the fuel cell temperature that is calculated when the system is started.

However, since the above-described fuel cell system determines the fuel cell temperature at the start of the system using a cooling water temperature sensor, there is a problem that it is necessary to run cooling water for several seconds or so after the system is started and then detect the cooling water temperature, and it therefore takes time until the fuel cell temperature is calculated. In this way, if it takes time to calculate the fuel cell temperature, judgment as to whether to allow the vehicle to drive using the fuel cell temperature is also delayed.

It is therefore an object of the present invention to provide a fuel cell system that can calculate the fuel cell temperature at the start of the system in a short time and accurately.

According to an aspect of the present invention, a fuel cell system including a fuel cell that receives a supply of an anode gas and a cathode gas and generates power, is provided. The fuel cell system includes: a water content calculation unit configured to calculate a water content of the fuel cell; an internal impedance calculation unit configured to calculate an internal impedance of the fuel cell; and a starting temperature calculation unit configured to calculate a fuel cell temperature at a start of the system, based on the water content of the fuel cell as of a last time the system was stopped, calculated in the water content calculation unit, and the internal impedance of the fuel cell at the start of the system, calculated in the internal impedance calculation unit.

Embodiments and advantages of the present invention will be described in detail below with reference to the attached figures.

DESCRIPTION OF EMBODIMENTS

First Embodiment

A fuel cell is formed by sandwiching an electrolyte membrane between an anode electrode, which serves as a fuel electrode, and a cathode electrode, which serves as an oxidizer electrode. The fuel cell generates power using an anode gas, which is supplied to the anode electrode and which contains hydrogen, and a cathode gas, which is supplied to the cathode electrode and which contains oxygen. The electrochemical reactions that take place in both electrodes of the anode electrode and the cathode electrode are as follows:

Anode electrode: $2H_2 \rightarrow 4H^+ + 4e^-$ (1)

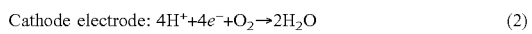

Cathode electrode: $4H^+ + 4e^- + O_2 \rightarrow 2H_2O$ (2)

By these electrochemical reactions of (1) and (2), the fuel cell generates an electromotive force of approximately 1V (volt).

When a fuel cell of this kind is used as a source of force for an automobile, given that the power to be required is substantial, several hundreds of fuel cells are stacked in layers and used as a fuel cell stack. Then, by forming a fuel cell system to supply an anode gas and a cathode gas to the fuel cell stack, power for driving the vehicle is extracted.

Figure 1:
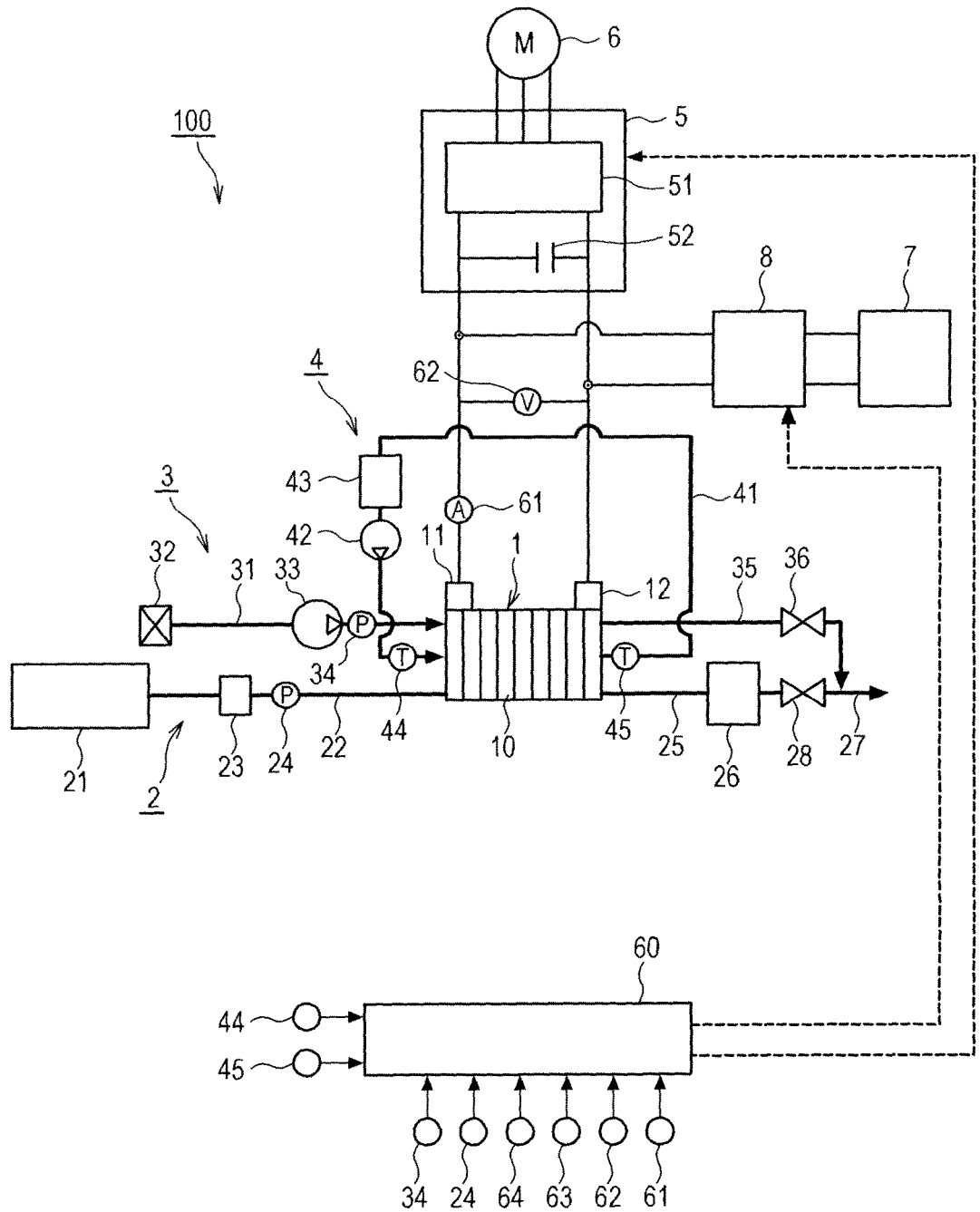
FIG. 1 is a schematic configuration diagram of a fuel cell system according to a first embodiment of the present invention.

FIG. 1 is a schematic configuration diagram of a fuel cell system 100 according to the first embodiment of the present invention.

The fuel cell system 100 has a fuel cell stack 1, an anode gas supply device 2, a cathode gas supply device 3, a cooling device 4, an inverter 5, a drive motor 6, a battery 7, a DC/DC converter 8, and a controller 60.

The fuel cell stack 1 is formed by stacking a predetermined number of fuel cell 10 in layers. The fuel cell stack 1 receives a supply of an anode gas (hydrogen) and a cathode gas (air) and generates power, and supplies power to various types of electronic equipment such as a drive motor 6 for driving the vehicle, and so on. The fuel cell stack 1 has an anode-side terminal 11 and a cathode-side terminal 12 as output terminals for extracting power.

The anode gas supply device 2 has a high-pressure tank 21, an anode gas supply passage 22, a pressure adjustment valve 23, a pressure sensor 24, an anode gas discharge passage 25, a buffer tank 26, a purge passage 27 and a purge valve 28.

The high-pressure tank 21 is a container to keep and stock the hydrogen, that is supplied to the fuel cell stack 1 as an anode gas, in a high-pressure state.

The anode gas supply passage 22 is a passage for supplying the anode gas discharged from the high-pressure tank 21 to the fuel cell stack 1. One end of the anode gas supply passage 22 is connected to the high-pressure tank 21, and the other end is connected to the anode gas inlet portion of the fuel cell stack 1.

The pressure adjustment valve 23 is an electromagnetic valve that allows continuous or stepwise adjustment of the opening, and is provided in the anode gas supply passage 22. The pressure adjustment valve 23 adjusts the anode gas discharged from the high-pressure tank 21 in a high-pressure state, to a predetermined pressure. The opening of the pressure adjustment valve 23 is controlled by the controller 60.

The pressure sensor 24 is provided in the anode gas supply passage 22 downstream of the pressure adjustment valve 23. The pressure sensor 24 detects the pressure of the anode gas that runs in the anode gas supply passage 22. The pressure of the anode gas detected in the pressure sensor 24 represents the pressure of the whole anode system, including the buffer tank 26, the anode gas flow path inside the fuel cell stack 1 and so on.

The anode gas discharge passage 25 is a passage that connects between the fuel cell stack 1 and the buffer tank 26. One end of the anode gas discharge passage 25 is connected to the anode gas outlet portion of the fuel cell stack 1, and the other end is connected to an upper part of the buffer tank 26. Through the anode gas discharge passage 25, a mixed gas (hereinafter referred to as "anode-off gas") of the excess anode gas that was not used in electrochemical reactions, and impurity gases that have leaked and come from the cathode side to the anode gas flow path inside the fuel cell stack 1, including nitrogen, water vapor and so on.

The buffer tank 26 is a container to temporarily store the anode-off gas that has run through the anode gas discharge passage 25. Part of the water vapor contained in the anode-off gas is condensed and becomes condensed water, and is separated from the anode-off gas, inside the buffer tank 26.

The purge passage 27 is a passage to allow the buffer tank 26 to connect with the outside. One end of the purge passage 27 is connected to a lower part of the buffer tank 26, and the other end of the purge passage 27 is formed as an open end. The anode-off gas that is stocked in the buffer tank 26 is diluted by a cathode-off gas that flows into the purge passage 27 from a cathode gas discharge passage 35, which will be described later, and is discharged from the open end of the purge passage 27 to the outside with the condensed water.

The purge valve 28 is an electromagnetic valve that allows continuous or stepwise adjustment of the opening, and is provided in the purge passage 27. By adjusting the opening of the purge valve 28, the amount of the anode-off gas to be discharged from the purge passage 27 to the outside is adjusted. The opening of the purge valve 28 is controlled by the controller 60.

The cathode gas supply device 3 has a cathode gas supply passage 31, a filter 32, a compressor 33, a pressure sensor 34, a cathode gas discharge passage 35, and a pressure adjustment valve 36.

The cathode gas supply passage 31 is a passage in which the air, which is the cathode gas to be supplied to the fuel cell stack 1, runs. One end of the cathode gas supply passage 31 is connected to the filter 32, and the other end is connected to the cathode gas inlet portion of the fuel cell stack 1.

The filter 32 removes foreign substances such as dirt and dust contained in the air that is taken in from the outside. The air, from which foreign substances have been removed by the filter 32, becomes the cathode gas to be supplied to the fuel cell stack 1.

The compressor 33 is provided in the cathode gas supply passage 31 between the filter 32 and the fuel cell stack 1. The compressor 33 sends the cathode gas taken in via the filter 32 to the fuel cell stack 1 by applying pressure.

The pressure sensor 34 is provided in the cathode gas supply passage 31 downstream of the compressor 33. The pressure sensor 34 detects the pressure of the cathode gas that flows in the cathode gas supply passage 31. The pressure of the cathode gas detected in the pressure sensor 34 represents the pressure of the whole cathode system, including the cathode gas flow path inside the fuel cell stack 1 and so on.

The cathode gas discharge passage 35 is a passage to connect between the fuel cell stack 1 and the purge passage 27 of the anode gas supply device 2. One end of the cathode gas discharge passage 35 is connected to the cathode gas outlet portion of the fuel cell stack 1, and the other end is connected to the purge passage 27, which is downstream of the purge valve 28. The cathode gas that was not used in the electrochemical reactions in the fuel cell stack 1 is discharged as the cathode-off gas to the purge passage 27 via the cathode gas discharge passage 35.

The pressure adjustment valve 36 is an electromagnetic valve that allows continuous or stepwise adjustment of the opening, and is provided in the cathode gas discharge passage 35. The opening of the pressure adjustment valve 36 is controlled by the controller 60. The pressure adjustment valve 36 adjusts the pressure of the cathode gas to be supplied to the fuel cell stack 1.

The cooling device 4 is a device for cooling the fuel cell stack 1 with cooling water, and has a cooling water circulation passage 41, a cooling water circulation pump 42, a radiator 43, and cooling water temperature sensors 44 and 45.

The cooling water circulation passage 41 is a passage where the cooling water for cooling the fuel cell stack 1 runs. One end of the cooling water circulation passage 41 is connected to the cooling water inlet portion of the fuel cell stack 1, and the other end is connected to the cooling water outlet portion of the fuel cell stack 1.

The cooling water circulation pump 42 is a pressure device that circulates cooling water. The cooling water circulation pump 42 is provided in the cooling water circulation passage 41.

The radiator 43 is a heat sink for cooling the cooling water discharged from the fuel cell stack 1, and is provided in the cooling water circulation passage 41 upstream of the cooling water circulation pump 42.

The cooling water temperature sensors 44 and 45 are sensors for detecting the temperature of the cooling water. The cooling water temperature sensor 44 is provided in the cooling water circulation passage 41 near the cooling water inlet portion of the fuel cell stack 1, and detects the temperature of the cooling water that runs into the fuel cell stack 1. By contrast with this, the cooling water temperature sensor 45 is provided in the cooling water circulation passage 41 near the cooling water outlet portion of the fuel cell stack 1, and detects the temperature of the cooling water discharged from the fuel cell stack 1.

The inverter 5 has a switch unit 51 and a smoothing capacitor 52, and is electrically connected to the fuel cell stack 1 via the anode-side terminal 11 and the cathode-side terminal 12. The switch unit 51 is formed with a plurality of switching elements, and converts DC into AC or AC into DC. The smoothing capacitor 52 is connected with the fuel cell stack 1 in parallel, and suppresses the ripples produced by the switching in the switch unit 51 and so on.

The drive motor 6 is a three-phase AC motor, operates on an AC current supplied from the inverter 5 and produces a torque that allows a vehicle to drive.

The battery 7 is electrically connected to the drive motor 6 and the fuel cell stack 1 via the DC/DC converter 8. The battery 7 is a secondary cell which can charge and discharge power, such as a lithium ion secondary cell or the like.

The DC/DC converter 8 is electrically connected to the fuel cell stack 1. The DC/DC converter 8 is a bidirectional voltage converter that makes the voltage of the fuel cell stack 1 rise and drop, and acquires a DC output from a DC input, and also converts an input voltage into an arbitrary output voltage.

The controller 60 is formed with a microcomputer having a central processing unit (CPU), a read-only memory (ROM), a random access memory (RAM) and an input/output interface (I/O interface). In the controller 60, detection signals from a current sensor 61 that detects the output current of the fuel cell stack 1, a voltage sensor 62 that detects the output voltage of the fuel cell stack 1, an accelerator pedal sensor 63 that detects the amount the accelerator pedal provided in the vehicle is depressed, and an SOC sensor 64 that detects the amount of charge in the battery 7, in addition to the pressure sensors 24 and 34, and the cooling water temperature sensors 44 and 45, are input as signals for detecting the operation state of the fuel cell system 100.

Based on these input signals, the controller 60 calculates the target fuel cell voltage of the fuel cell stack 1 and so on, and controls the amount of flow of the anode gas and the cathode gas and so on to supply to the fuel cell stack 1.

Figure 4:
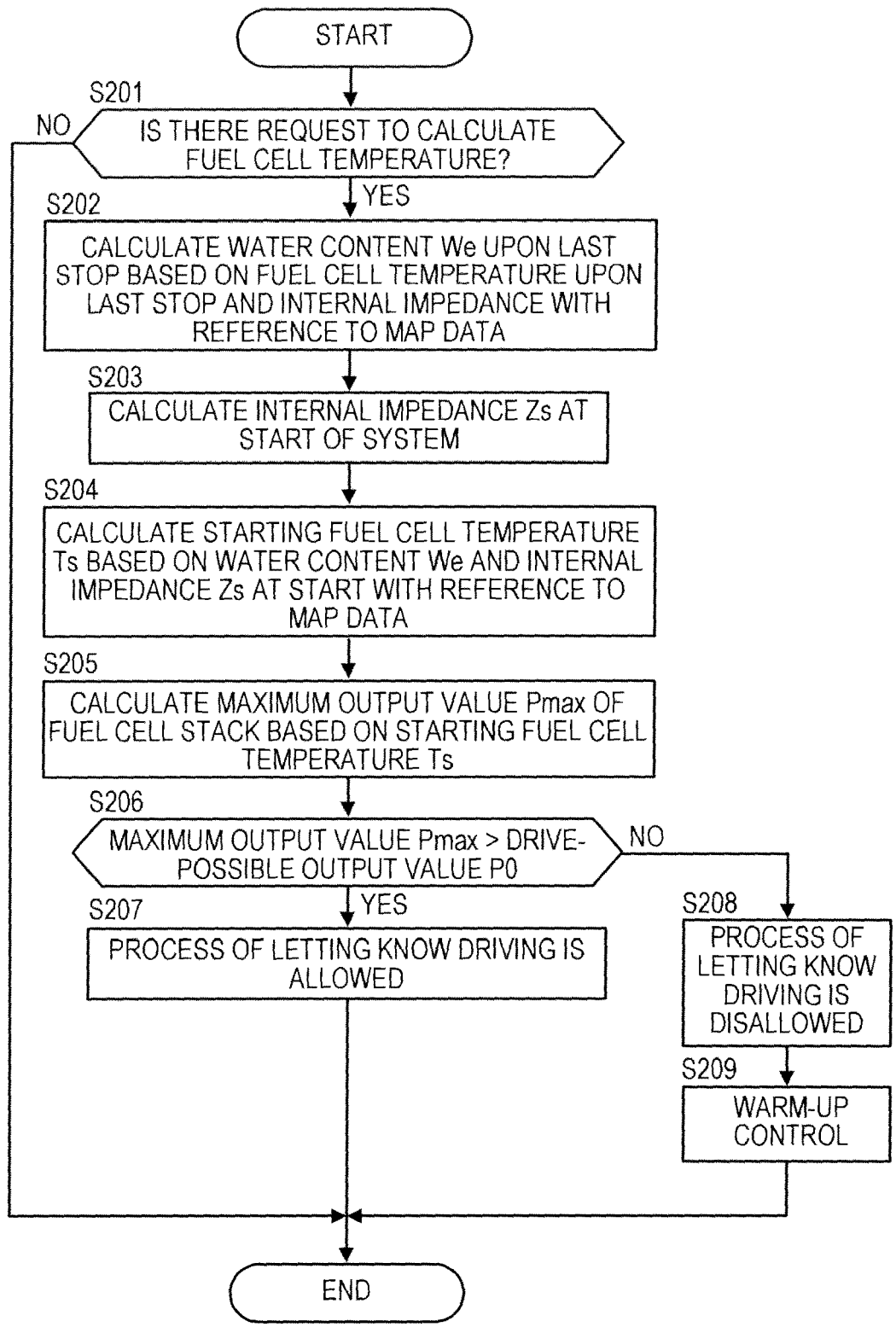
FIG. 4 is a flowchart showing a process of judging whether to allow a vehicle to drive at the start of the system, executed by a controller.

Also, at the start of the system, that is, when the fuel cell system 100 is started, the controller 60 calculates the fuel cell temperature of the fuel cell stack 1 (the temperature of the electrolyte membrane of the fuel cell 10), and, based on the fuel cell temperature calculated, renders judgment as to whether to allow the vehicle to drive (see FIG. 4).

With the fuel cell system 100 according to the present embodiment, the controller 60 calculates the fuel cell temperature accurately shortly after the system is started, by using the water content of the fuel cell stack 1 (the degree of moisture of the electrolyte membrane) as of the last time the system was stopped, and the internal impedance (the internal impedance of the electrolyte membrane) of the fuel cell stack 1 at the start of the system this time.

First, the method of calculating the internal impedance of the fuel cell stack 1 will be described with reference to FIG. 2.

Figure 2:
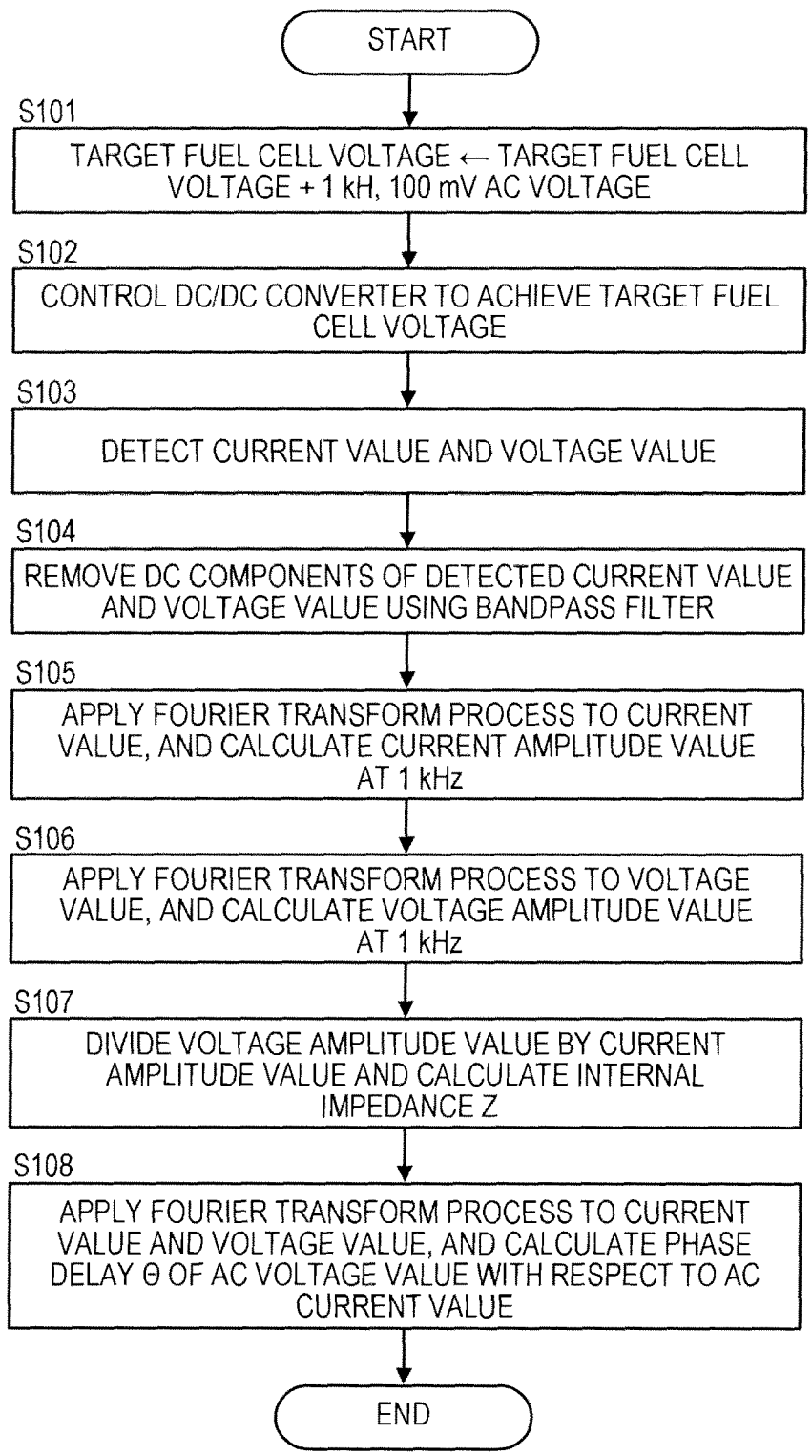
FIG. 2 is a flowchart showing an internal impedance calculation process, executed by a controller provided in the fuel cell system.

FIG. 2 is a flowchart of the process of calculating the internal impedance of the fuel cell stack 1, executed by the controller 60. The internal impedance calculation process in the fuel cell stack 1 is based on the AC impedance method, which has been known heretofore. The internal impedance calculation process is executed at a predetermined time where it becomes necessary to calculate the internal impedance of the fuel cell stack 1.

In S101 (step 101), the controller 60 sets the target fuel cell voltage of the fuel cell stack 1, which is set in accordance with the driving state of the vehicle, plus an AC voltage value of 1 kHz, as the target fuel cell voltage for this time.

In S102, the controller 60 controls the DC/DC converter 8 so as to achieve the target fuel cell voltage set in S101. By controlling the DC/DC converter 8 and applying an AC voltage to the fuel cell stack 1, an AC current is superimposed on the output current of the fuel cell stack 1. By controlling the DC/DC converter 8 in this way, the output signal of the fuel cell becomes an AC voltage and an AC current that include a 1-kHz frequency.

In S103, the controller 60 detects the output current of the fuel cell stack 1 using the current sensor 61, and also detects the output voltage of the fuel cell stack 1 using the voltage sensor 62.

Figure 3:
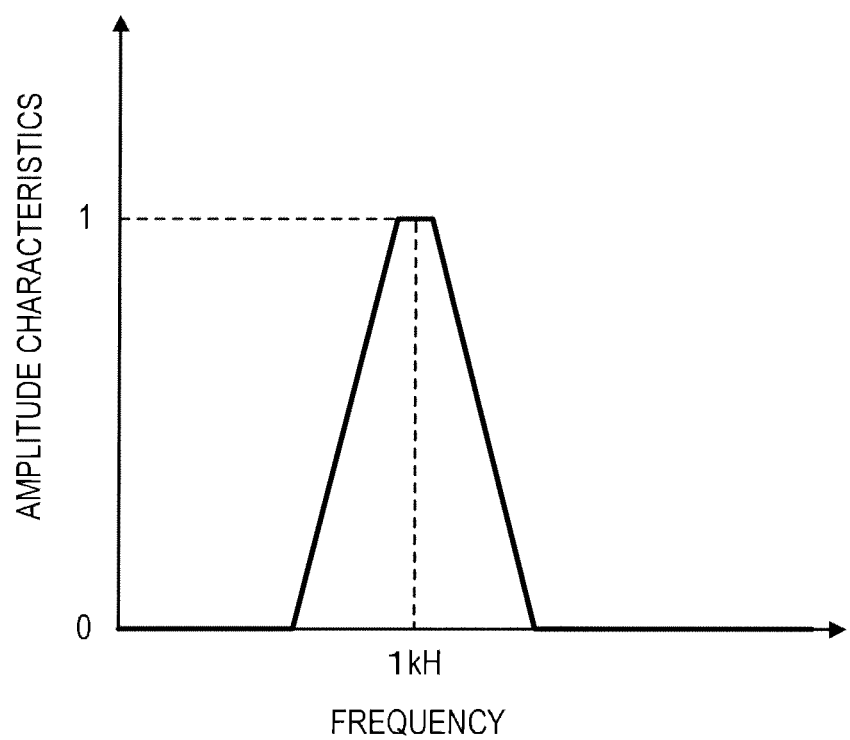
FIG. 3 is a diagram showing frequency—amplitude characteristics of a bandpass filter.

In S104, the controller 60 removes the DC components of the current value and the voltage value detected in S103 using a bandpass filter, and calculates an AC current value and an AC voltage value. Note that, as shown in FIG. 3, the bandpass filter is a filter to have frequency-amplitude characteristics in which the center of the pass band is set at 1 kHz.

In S105, the controller 60 applies a conventional Fourier transform process to the AC current value, and calculates the current amplitude value at 1 kHz.

In S106, the controller 60 applies a conventional Fourier transform process to the AC voltage value, and calculates the voltage amplitude value at 1 kHz.

In S107, the controller 60 divides the voltage amplitude value calculated in S106 by the current amplitude value calculated in S105, and calculates the internal impedance Z of the fuel cell stack 1.

In S108, the controller 60 applies a Fourier transform process to the AC current value and the AC voltage value, calculates the phase delay θ of the AC voltage value with respect to the AC current value, and terminates the internal impedance calculation process.

Next, the process of judging whether to allow the vehicle to drive at the start of the system, executed by the controller 60, will be described with reference to FIG. 4. The process of judging whether to allow the vehicle to drive is executed in a predetermined operation cycle (for example, a 100 micro second cycle) after an ignition switch is turned on, until vehicle is allowed to drive.

In S201, the controller 60 determines whether or not there is a request to calculate the fuel cell temperature. When the system was just started, when it has been let known that the vehicle is not allowed to drive, and so on, the controller 60 determines that there is a fuel cell temperature calculation request and executes the process of S202. By contrast with this, when it has been let known that the vehicle is allowed to drive and so on, the controller 60 determines that there is no fuel cell temperature calculation request and terminates the process of judging whether to allow the vehicle to drive.

Figure 5:
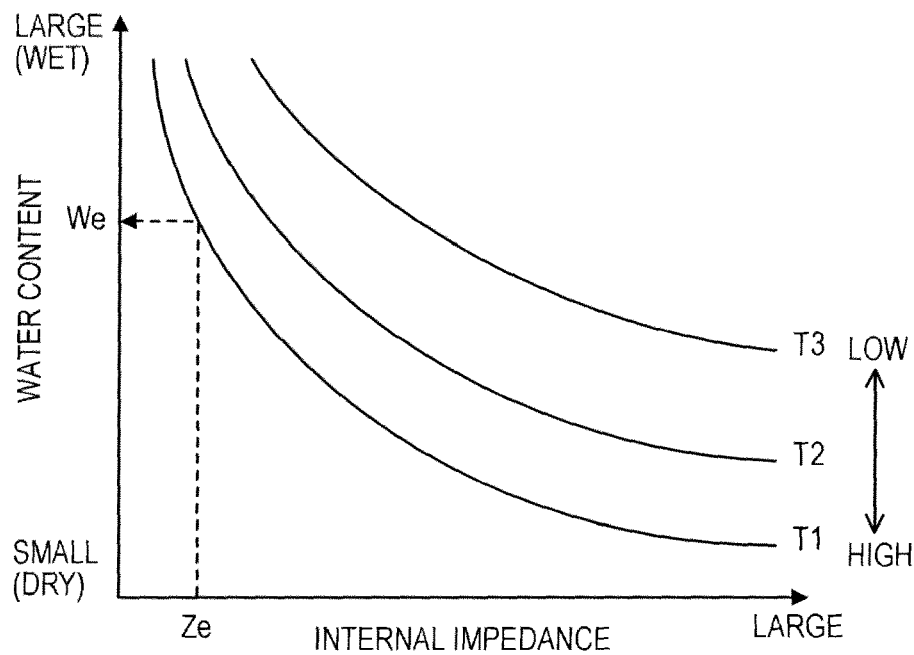
FIG. 5 shows map data that represents the relationship between the internal impedance of a fuel cell stack and the water content of the fuel cell stack per predetermined temperature.

In S202, the controller 60 calculates the water content of the fuel cell stack 1 when the system was stopped, based on the fuel cell temperature and the internal impedance of the fuel cell stack 1 as of the last time the system was stopped, with reference to the map data shown in FIG. 5.

Note that the fuel cell temperature as of the last time the system was stopped is the average value of the cooling water temperature detected by the cooling water temperature sensor 44 and the cooling water temperature detected by the cooling water temperature sensor 45 when the ignition switch was turned off. Also, the internal impedance of the fuel cell stack 1 as of the last time the system was stopped is the internal impedance calculated in the internal impedance calculation process (see FIG. 2) when the ignition switch was turned off.

FIG. 5 shows the map data that is used to calculate the water content of the fuel cell stack 1. This map data is a characteristic diagram to define the relationship between the internal impedance of the fuel cell stack 1 and the water content of the fuel cell stack 1 per predetermined temperature in the temperature range in which the fuel cell system 100 is used. The map data is data that is set in advance, and is stored in the ROM or the like in the controller 60.

As shown by the map data of FIG. 5, when the fuel cell temperature is constant, the lower the water content of the fuel cell stack 1, that is, the drier the electrolyte membrane of the fuel cell 10, the greater the internal impedance of the fuel cell stack 1 is. Also, when the water content of the fuel cell stack 1 is constant, the lower the fuel cell temperature, the greater the internal impedance of the fuel cell stack 1 is. In this way, the isotherm in the internal impedance-water content characteristics is positioned nearer the upper right part in the drawing as the fuel cell temperature increases.

For example, if the fuel cell temperature as of the last time the system was stopped is T1 and the internal impedance of the fuel cell stack 1 is Ze, the water content of the fuel cell stack 1 as of the last time the system was stopped is calculated to be We, from the map data of FIG. 5.

After calculating the water content We of the fuel cell stack 1 in S202 of FIG. 4, in S203, the controller 60 calculates the internal impedance Zs of the fuel cell stack 1 at the start of the system. The internal impedance of the fuel cell stack 1 at the start of the system is calculated by the internal impedance calculation process (see FIG. 2) when the ignition switch is turned on.

Figure 6:
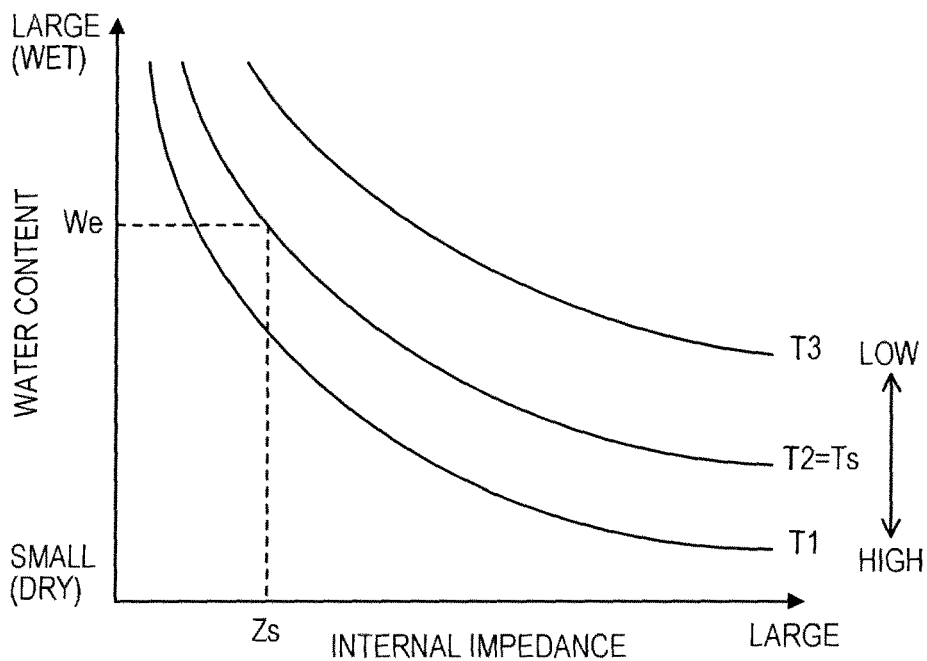
FIG. 6 shows map data that represents the relationship between the internal impedance of the fuel cell stack and the water content of the fuel cell stack per predetermined temperature.

In S204, the controller 60 calculates the starting fuel cell temperature Ts at the start of the system, based on the water content We of the fuel cell stack 1 as of the last time the system was stopped, calculated in S202, and the internal impedance Zs at the start of the system, calculated in S203, with reference to the map data shown in FIG. 6.

FIG. 6 shows the map data that is used to calculate the fuel cell temperature. The map data of FIG. 6 is the same map data as the map data shown in FIG. 5. When the water content of the fuel cell stack 1 as of the last time the system was stopped is We and the internal impedance of the fuel cell stack 1 at the start of the system is Zs, the starting fuel cell temperature Ts is calculated to be T2 from the map data of FIG. 6.

Note that the calculation of the starting fuel cell temperature Ts uses the water content We of the fuel cell stack 1 as of the last time the system was stopped, based on the premise that the water content of the fuel cell stack 1 has not changed much between the last stop and the start this time.

Figure 7:
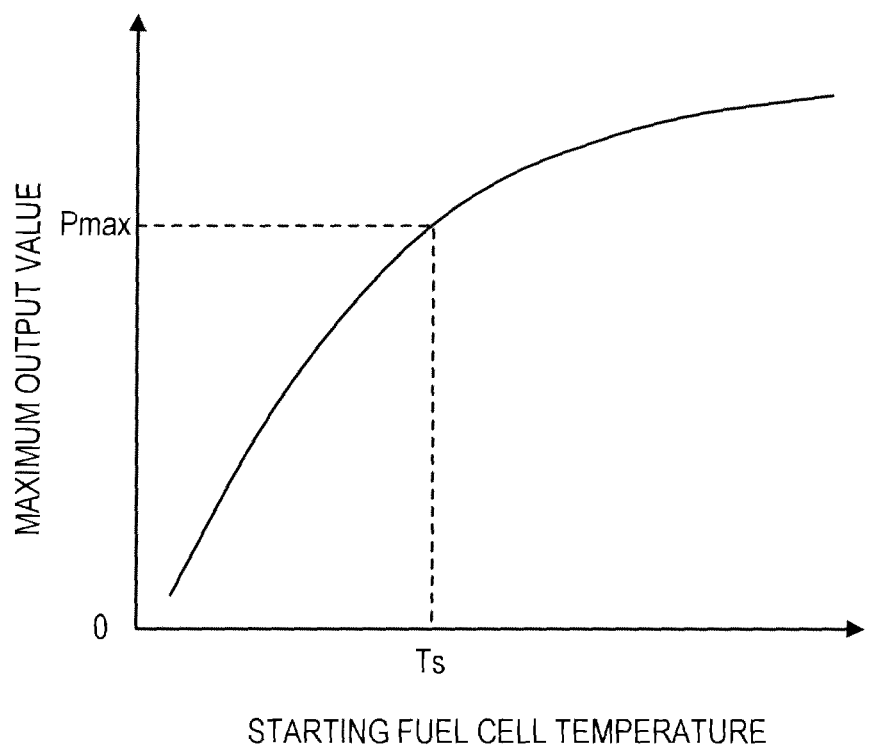
FIG. 7 is a diagram showing starting fuel cell temperature—maximum output value characteristics.

In S205 of FIG. 4, the controller 60 calculates the maximum output value Pmax of the fuel cell stack 1 based on the starting fuel cell temperature Ts. The maximum output value Pmax of the fuel cell stack 1 is determined from the starting fuel cell temperature-maximum output value characteristics set in advance, shown in FIG. 7. As shown in FIG. 7, the higher the starting fuel cell temperature Ts is, the greater the maximum output value Pmax of the fuel cell stack 1 at the start of the system is.

In S206, the controller 60 determines whether or not the maximum output value Pmax is greater than a drive-possible output value P0. The drive-possible output value P0 is set based on the output current value of the fuel cell stack 1 which can produce the torque that is necessary to allow the drive motor 6 to make the vehicle drive.

In the process of S206, when the maximum output value Pmax is determined to be greater than the drive-possible output value P0, the controller 60 executes the process of S207.

In S207, the controller 60 determines that it is possible to make the vehicle drive and executes a process of letting know that driving is allowed, and terminates the process of judging whether to allow the vehicle to drive. In the process of letting know that driving is allowed, the driver is let known that the vehicle is in a state driving is possible, by, for example, making a blue drive-allow lamp flicker on and off.

On the other hand, if the maximum output value Pmax is determined to be equal to or lower than the drive-possible output value P0 in the process of S206, the controller 60 executes the processes of S208 and S209.

In S208, the controller 60 judges that the fuel cell temperature at the start of the system is low and the output from the fuel cell stack 1 is insufficient, and that the vehicle therefore needs to be kept from driving, and executes a process of letting know that driving is disallowed. In the process of letting know that driving is disallowed, the driver is let known that the vehicle is in a state driving is disallowed, by, for example, making a red drive-disallow lamp flicker on and off.

In S209, the controller 60 executes a warm-up process for warming up the fuel cell stack 1, and terminates the process of judging whether to allow the vehicle to drive. In the warm-up process, power is supplied from the fuel cell stack 1 to auxiliary equipment and so on that can operate on a lower output than the maximum output value Pmax of the fuel cell stack 1, to warm up the fuel cell stack 1.

Note that it is equally possible to operate a heater using power from the battery 7 and warm up the fuel cell stack 1 via the heater.

Also, although, in the processes of S205 and S206, judgment as to whether to allow driving or disallow driving is made based on the maximum output value Pmax that is calculated from the starting fuel cell temperature Ts, it is equally possible to judge whether to allow driving or disallow driving based on the starting fuel cell temperature Ts. In this case, the controller 60 executes the process of S207 when the starting fuel cell temperature Ts is greater than a reference temperature (for example, 0° C.), and executes the processes of S208 and S209 when the starting fuel cell temperature Ts is equal to or lower than the reference temperature.

The following advantages can be achieved from the above-described fuel cell system 100 of the first embodiment.

The fuel cell system 100 calculates the water content of the fuel cell stack 1 based on the cooling water temperature and the internal impedance of the fuel cell stack 1 detected when the system was stopped last time, and calculates the starting fuel cell temperature at the start of the system based on the water content of the fuel cell stack 1 as of the last time the system was stopped and the internal impedance at the start of the system. In this way, the fuel cell temperature is calculated using the water content and the internal impedance of the fuel cell stack 1 that can be calculated nearly at the same time as the start of the system, so that it is possible to determine the fuel cell temperature highly accurately shortly after the system is started, compared to the conventional technology to circulate cooling water after the system is started and then calculate the fuel cell temperature based on the detection value of a cooling water temperature sensor.

Also, the fuel cell system 100 makes judgment as to whether or not driving is possible based on the starting fuel cell temperature or the maximum output value of the fuel cell stack 1 that is determined from the starting fuel cell temperature, and therefore it is able to have the result of judgment as to whether or not driving is possible, shortly after the system is started.

Furthermore, the fuel cell system 100 makes judgment as to whether or not a warm-up is possible based on the starting fuel cell temperature or the maximum output value of the fuel cell stack 1 that is determined from the starting fuel cell temperature, and therefore it is able to have the result as to whether or not a warm-up is possible, shortly after the system is started.

Second Embodiment

Next, the fuel cell system 100 according to a second embodiment of the present invention will be described. The fuel cell system 100 of the present embodiment is different from the fuel cell system of the first embodiment in executing a drying operation such that the water content of the fuel cell stack 1 decreases when the system stops. Now, the following description will primarily focus on that difference.

Note that, in each of the following embodiments, components and so on that perform the same functions as in the first embodiment will be assigned the same codes and overlapping descriptions will be omitted as adequate.

Figure 8:
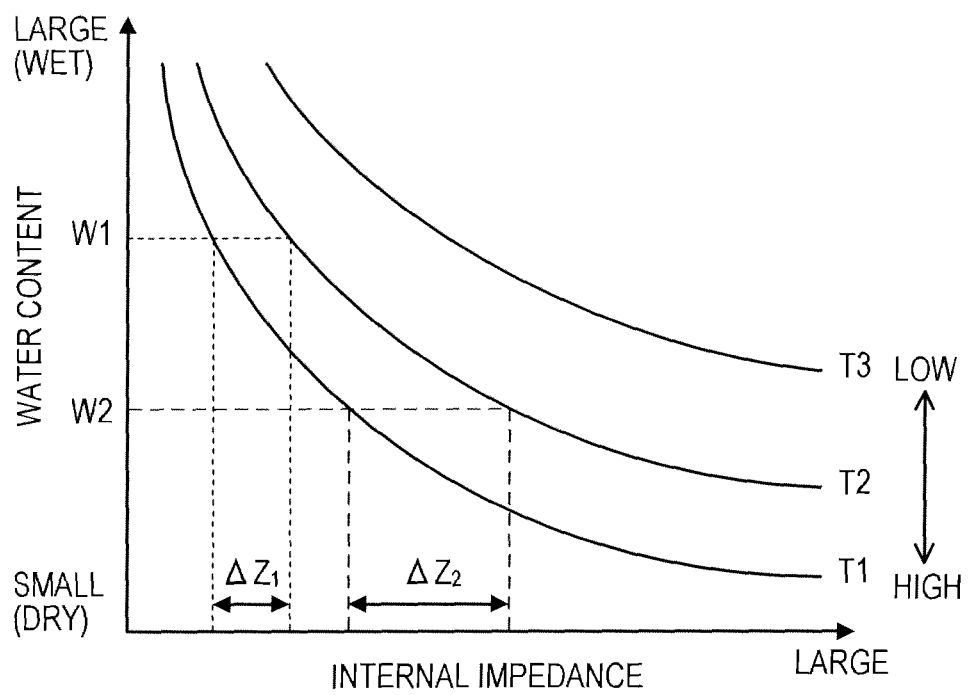
FIG. 8 shows map data that represents the relationship between the internal impedance of the fuel cell stack and the water content of the fuel cell stack per predetermined temperature.

FIG. 8 shows the map data that is used to calculate the water content of the fuel cell stack 1 and the starting fuel cell temperature, in the process of judging whether to allow driving, which is executed by the controller 60 provided in the fuel cell system 100 according to the second embodiment. The map data of FIG. 8 is the same as the map data of FIG. 5 and FIG. 6.

As shown in FIG. 8, in the internal impedance-water content characteristics per fuel cell temperature, the amount of change $\Delta Z$ of the internal impedance of the fuel cell stack 1 in response to fuel cell temperature changes becomes greater as the water content of the fuel cell stack 1 becomes lower. For example, the amount of change of the internal impedance of the fuel cell stack 1 when the fuel cell temperature changes from T1 to T2 becomes $\Delta Z1$ if the water content of the fuel cell stack 1 is W1, and becomes $\Delta Z2$, which is greater than $\Delta Z1$, if the water content of the fuel cell stack 1 is W2.

With the fuel cell system 100 of the second embodiment, the accuracy of internal impedance detection at the next start of the system is improved by executing a drying operation such that the water content of the fuel cell stack 1 decreases before the system stops and providing a state in which the amount of change of internal impedance in response to fuel cell temperature changes increases.

Figure 9:
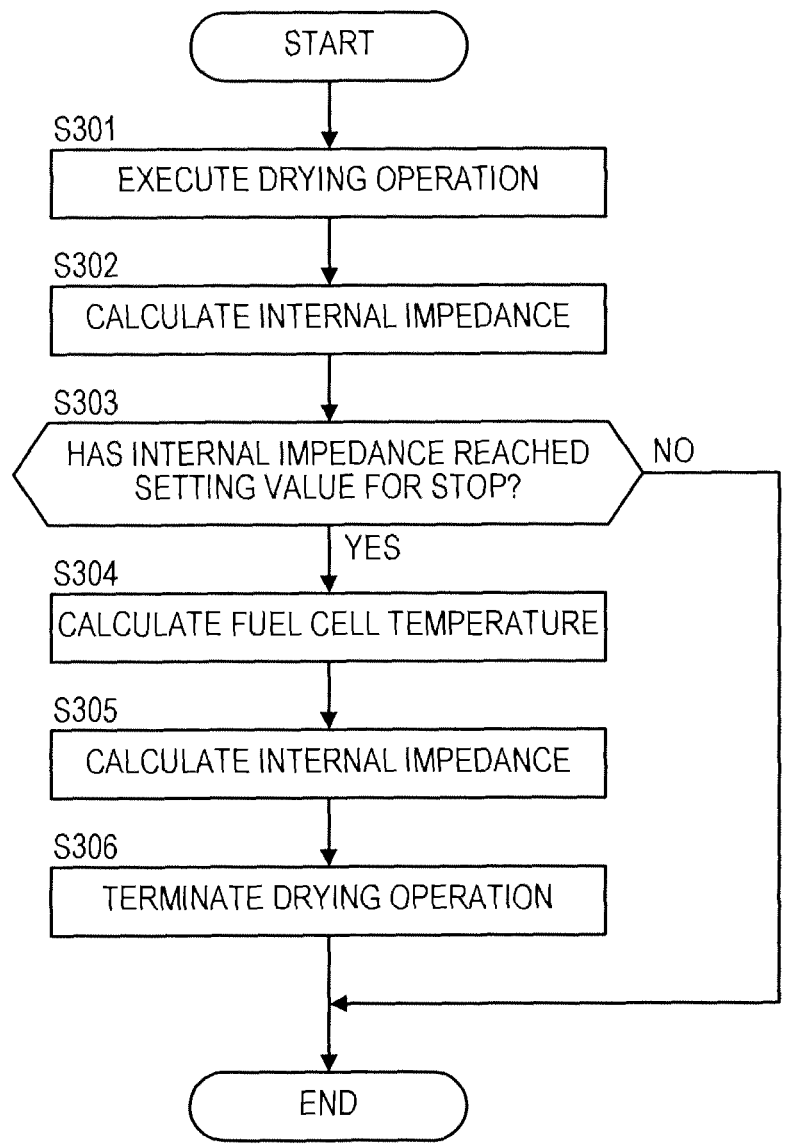
FIG. 9 is a flowchart showing a drying operation control process executed by a controller provided in a fuel cell system according to a second embodiment.

FIG. 9 is a flowchart showing the drying operation control process executed by the controller 60. The drying operation control process is executed in a predetermined operation cycle (for example, a 100 micro second cycle) after the ignition switch is turned off, until the drying operation is finished.

In S301, the controller 60 executes the drying operation which decreases the water content of the fuel cell stack 1.

The fuel cell system 100 executes a control such that the internal impedance of the fuel cell stack 1 during normal operation assumes a setting value for normal operation, so that the electrolyte membrane of the fuel cell 10 maintains an adequate degree of moisture, and the rate of power generation increases. When the ignition switch is turned off, the system is not stopped immediately, and the drying operation is executed. In the drying operation, the target internal impedance of the fuel cell stack 1 is switched from the setting value for normal operation to the setting value for stop, which is set higher than the setting value for normal operation. Then, until the internal impedance of the fuel cell stack 1 reaches the setting value for stop, the water content of the fuel cell stack 1 is lowered by, for example, increasing the amount of the cathode gas supply to the fuel cell stack 1.

In S302, the controller 60 calculates the internal impedance of the fuel cell stack 1 upon the drying operation based on the internal impedance calculation process of FIG. 2.

In S303, the controller 60 determines whether or not the internal impedance upon the drying operation, calculated in S302, has reached the setting value for stop.

If the internal impedance upon the drying operation has not reached the setting value for stop, the controller 60 terminates the drying operation control process, without executing the process of terminating the drying operation in S304 to S306.

On the other hand, if the internal impedance upon the drying operation has reached the setting value for stop, the controller 60 executes the process of terminating the drying operation in S304 to S306.

In S304, the controller 60 calculates the average value of the cooling water temperature detected in the cooling water temperature sensor 44 and the cooling water temperature detected in the cooling water temperature sensor 45, as the fuel cell temperature at the stop of the system.

In S305, the controller 60 calculates the internal impedance of the fuel cell stack 1 at the stop of the system, based on the internal impedance calculation process of FIG. 2.

The fuel cell temperature and the internal impedance at the stop of the system, calculated in S304 and S305, are used to calculate the water content of the fuel cell stack 1 in S202 of FIG. 4.

In S306, the controller 60 terminates the drying operation and stops the fuel cell system 100.

The following advantages can be achieved from the above-described fuel cell system 100 of the second embodiment.

With the fuel cell system 100, a drying operation is executed such that the water content of the fuel cell stack 1 decreases before the system stops, so that the amount of change of the internal impedance of the fuel cell stack 1 in response to fuel cell temperature changes increases after the system is stopped, until the system is started next time, and consequently it is possible to improve the accuracy of calculation of the internal impedance at the start of the system. Therefore, it is possible to calculate the starting fuel cell temperature more accurately than the first embodiment.

Third Embodiment

Next, the fuel cell system 100 according to a third embodiment of the present invention will be described. The fuel cell system 100 of the present embodiment is different from the fuel cell system of the first or second embodiment in changing the method of calculating the starting fuel cell temperature in accordance with the anode gas concentration (hydrogen concentration) in the anode system.

In the internal impedance calculation process shown in FIG. 2, the internal impedance Z of the fuel cell stack 1 is calculated in S107, and also the phase delay $\theta$ of the AC voltage value with respect to the AC current value of 1 kHz is calculated in S108. A study by the present inventors has made it clear that this phase delay $\theta$ is correlated with the hydrogen concentration of the anode system. Here, assuming a case where an AC voltage of a predetermined frequency (for example 1 kHz) is superimposed on an equivalent circuit of the fuel cell, the phase delay $\theta$ refers to the delay of the voltage phase by the voltage drop due to the resistance components with respect to the phase of the current after the resistance components have passed. The resistance components include the electrolyte membrane resistance, the reaction resistance, and the electric double-layer capacity in the fuel cell.

Figure 10:
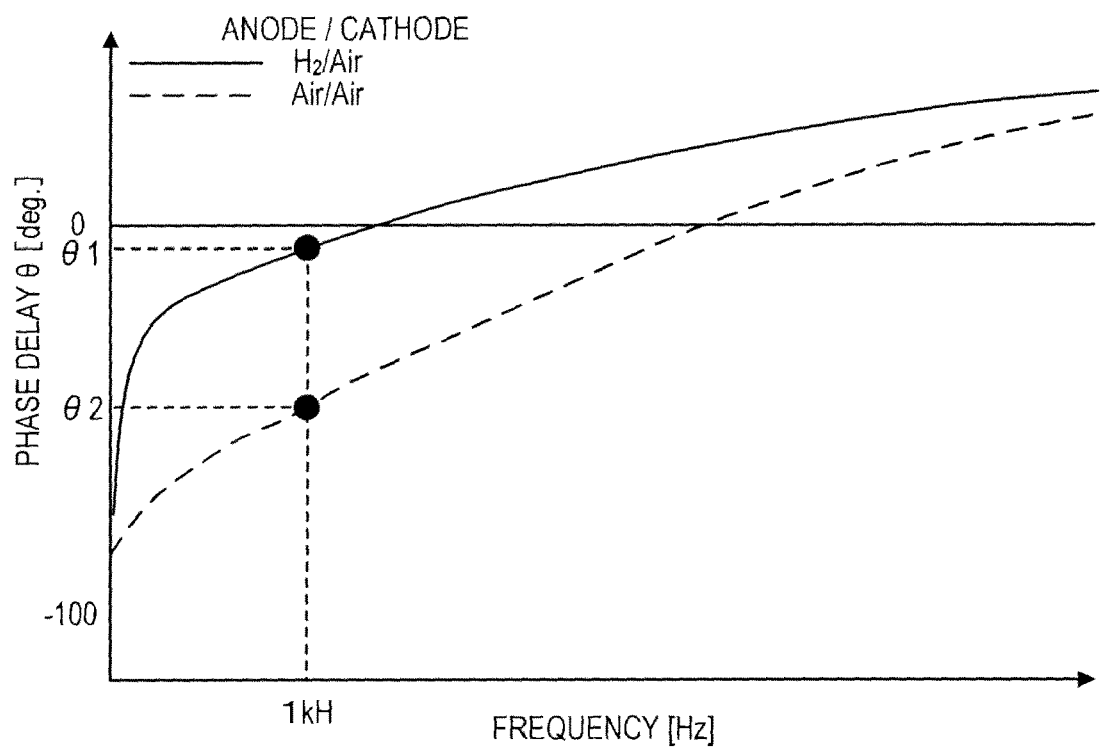
FIG. 10 is a diagram showing AC frequency—phase delay characteristics.

FIG. 10 is a diagram showing the relationship between AC frequency and phase delay $\theta$. The solid line represents the case where the anode system of the fuel cell system 100 is filled with hydrogen, and the broken line represents the case where the anode system is nearly filled with the air.

For example, in the state in which the anode system of the fuel cell system 100 is filled with hydrogen, such as shortly after the system stops and so on, the phase delay $\theta 1$ at 1 kHz, calculated in S108, becomes a value that is near zero, as shown by the solid line of FIG. 10.

On the other hand, when a predetermined period of time passes after the system stops, the anode system of the fuel cell system 100 is filled with the air that has leaked and come from the cathode-side and so on. In the state in which the anode system is nearly filled with the air and the hydrogen concentration is lowered, the phase delay $\theta 2$ at 1 kHz, calculated in S108, is calculated as a value that is significantly delayed from the phase delay $\theta 1$, as shown by the broken line of FIG. 10.

Figure 11:
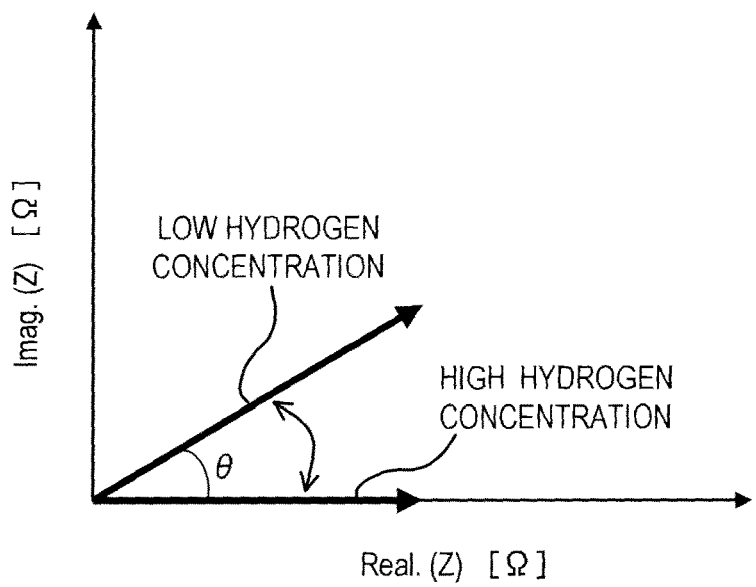
FIG. 11 is a diagram showing the internal impedance of a fuel cell stack, calculated when a 1-kHz AC current is superimposed on the fuel cell stack, on a complex plane.

In this way, the lower the hydrogen concentration in the anode system of the fuel cell system 100 is, the greater the phase delay $\theta$ of an AC voltage value with respect to an AC current value is. As shown in FIG. 11, when the hydrogen concentration in the anode system is low and the phase delay $\theta$ is significant, compared to the case where the hydrogen concentration in the anode system is high and there is little phase delay, the internal impedance is calculated to be large when the fuel cell temperature and the water content are constant.

FIG. 11 is a diagram showing the internal impedance of the fuel cell stack 1, calculated when a 1-kHz AC current is superimposed on the fuel cell stack 1, on a complex plane. The horizontal axis is the real part of internal impedance, and the vertical axis is the imaginary part of internal impedance.

As shown in FIG. 11, the internal impedance when the hydrogen concentration in the anode system is low has a substantial phase delay compared to the internal impedance when the hydrogen concentration in the anode system is high, and therefore the value of the real part changes little and the value of the imaginary part increases. By this means, the magnitude of internal impedance, represented by the length of the arrows, becomes bigger when the hydrogen concentration is low than when the hydrogen concentration is high.

In the fuel cell system 100 of the third embodiment, it is focused on the fact that the internal impedance of the fuel cell stack 1 changes in accordance with the hydrogen concentration of the anode system. It is possible to improve the accuracy of calculation of the starting fuel cell temperature by changing the method of calculating the starting fuel cell temperature in accordance with the hydrogen concentration of the anode system.

Figure 12:
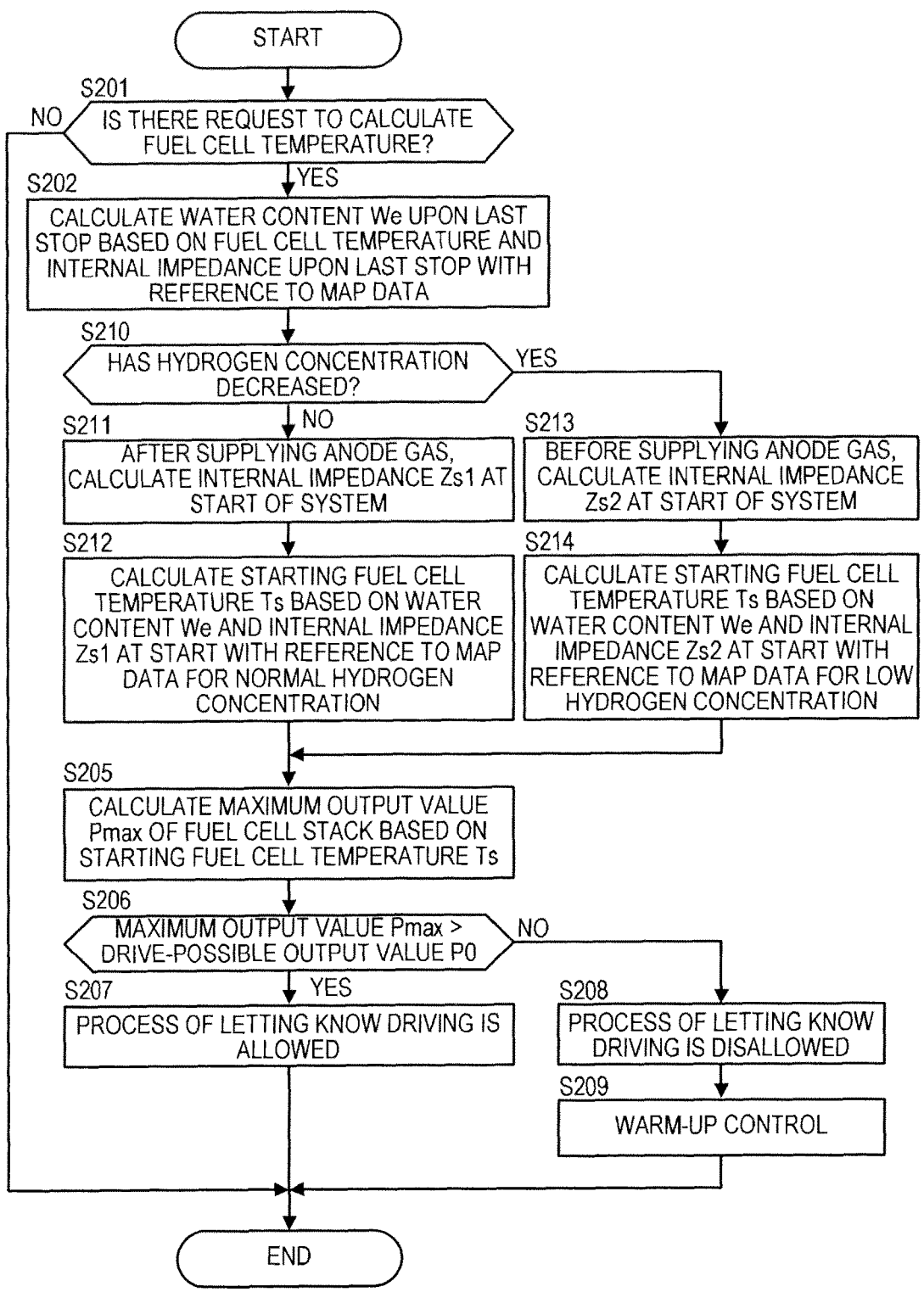
FIG. 12 is a flowchart showing a process of judging whether to allow a vehicle to drive at the start of the system, executed by a controller provided in a fuel cell system according to a third embodiment.

Now, the process of judging whether to allow the vehicle to drive at the start of the system, executed by the controller 60 provided in the fuel cell system 100 according to the third embodiment, will be described. In the process of judging whether to allow the vehicle to drive of FIG. 12, the processes of S210 to S214 are executed instead of executing the processes of S203 and S204 in FIG. 4. The processes of S201, S202, and S205 to S209 in FIG. 12 are the same as those of FIG. 4.

After the water content We of the fuel cell stack 1 at the last stop is calculated in the process of S202, the controller 60 determines whether or not the hydrogen concentration in the anode system in S210 has lowered. The hydrogen concentration is determined to have lowered based on the phase delay $\theta$ (S108 of FIG. 2) that is calculated shortly after the ignition switch is turned on and before hydrogen is supplied to the fuel cell stack 1.

When the phase delay $\theta$ is not delayed beyond the reference value, some hydrogen is still left in the anode system and the hydrogen concentration is determined not low, and the controller 60 executes the processes of S211 and S212.

In S211, after the pressure adjustment valve 23 is set to a predetermined opening and the anode gas is supplied to the fuel cell stack 1, the controller 60 calculates the internal impedance Zs1 of the fuel cell stack 1 at the start of the system. When there is some hydrogen and air left in the anode system, the accuracy of internal impedance calculation decreases due to variation in the hydrogen concentration distribution in the fuel cell stack 1. Consequently, by filling the anode system with hydrogen, the distribution of hydrogen concentration in the fuel cell stack 1 is made approximately uniform, and the decrease of the accuracy of internal impedance calculation is reduced.

In S212, the controller 60 calculates the starting fuel cell temperature Ts at the start of the system based on the water content We of the fuel cell stack 1 as of the last time the system was stopped and the internal impedance Zs1 at the start of the system, with reference to the map data for normal hydrogen concentration, which is the same map data as in FIG. 6.

After the process of S212, the controller 60 executes the processes of S205 and later.

On the other hand, in S210, when the phase delay $\theta$ is delayed beyond the reference value and a low hydrogen concentration, in which the anode system is nearly filled with the air, is determined, the controller 60 executes the processes of S213 and S214.

In S213, the controller 60 calculates the internal impedance Zs2 of the fuel cell stack 1 at the start of the system, before supplying the anode gas to the fuel cell stack 1. In the state where the anode system is nearly filled with the air, the internal impedance of the fuel cell stack 1 increases, so that the S/N ratio is improved, and it is possible to calculate internal impedance accurately.

In S214, the controller 60 calculates the starting fuel cell temperature Ts at the start of the system based on the water content We of the fuel cell stack 1 as of the last time the system was stopped and the internal impedance Zs2 at the start of the system, with reference to the map data for low hydrogen concentration. The internal impedance in the map data for low hydrogen concentration is set greater than the internal impedance that is assumed at the water content and the fuel cell temperature in the map data for normal hydrogen concentration.

After the process of S214, the controller 60 executes the processes of S205 and later.

The following advantages can be achieved from the above-described fuel cell system 100 of the third embodiment.

In the fuel cell system 100, in a low hydrogen concentration state in which the anode system is nearly filled with the air, before hydrogen (anode gas) is supplied to the fuel cell stack 1, the internal impedance Zs2 inside the fuel cell stack 1 at the start of the system is calculated. In the state in which the anode system is nearly filled with the air, the internal impedance of the fuel cell stack 1 increases, so that the S/N ratio upon calculating internal impedance is improved. It is possible to determine the starting fuel cell temperature Ts accurately using this internal impedance Zs2 at the start of the system.

Also, when a low hydrogen concentration state is not assumed inside the anode sequence, after supplying hydrogen (anode gas) to the fuel cell stack 1, the fuel cell system 100 calculates the internal impedance Zs1 of the fuel cell stack 1 at the start of the system. By filling the anode system with hydrogen and making the hydrogen concentration distribution in the fuel cell stack 1 approximately uniform, it is possible to reduce the decrease of the accuracy of the calculation of the internal impedance Zs1 at the start of the system.

Embodiments of the present invention were described above, but the above embodiments are merely examples of application of the present invention. The technical scope of the present invention is not limited to the specific constitutions of the above embodiments.

Figure 13:
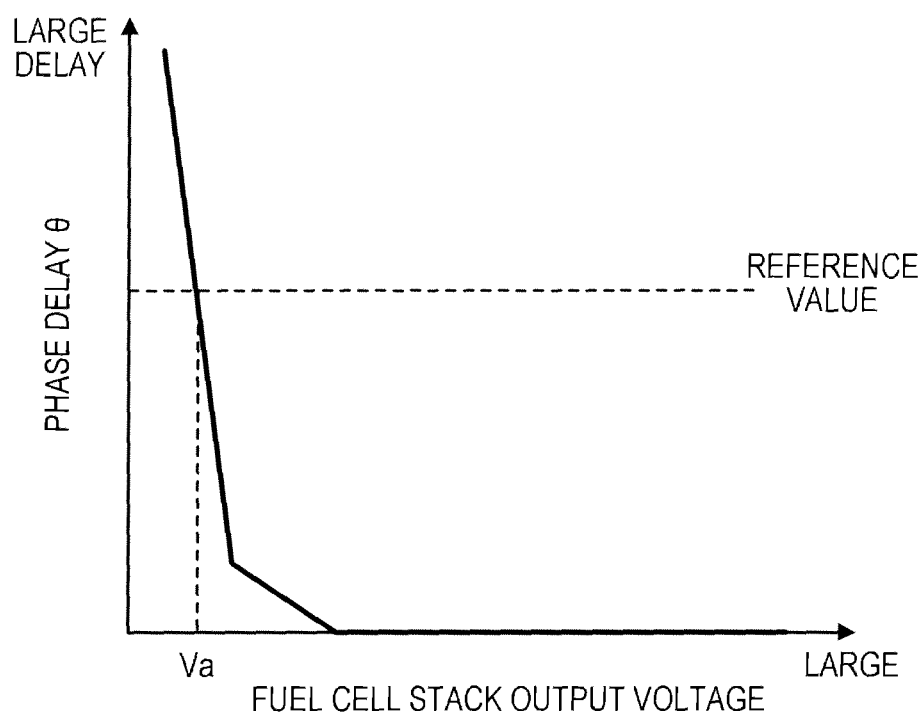
FIG. 13 is a diagram showing output voltage—phase delay characteristics of a fuel cell stack.

For example, although the fuel cell system 100 according to the third embodiment has been illustrated to determine the hydrogen concentration decrease by comparing the calculated phase delay θ and a reference value in S210 in the process of judging whether to allow the vehicle to drive shown in FIG. 12, and it is equally possible to determine the hydrogen concentration decrease based on the output voltage of the fuel cell stack 1 after the system is started and before hydrogen is supplied to the fuel cell stack 1. There is a correlation between the output voltage of the fuel cell stack 1 and the phase delay θ resulting from the hydrogen concentration in the anode system, as shown in FIG. 13. It is possible to detect that the phase delay θ is delayed beyond the reference value by detecting that the output voltage of the fuel cell stack 1 shortly after the system is started has become lower than Va. Consequently, when the output voltage of the fuel cell stack 1, detected before hydrogen is supplied to the fuel cell stack 1, is lower than the reference voltage Va, it is possible to determine that a low hydrogen concentration state is assumed inside the anode system.

This application claims priority based on Japanese Patent Application No. 2011-180603, filed with the Japan Patent Office on Aug. 22, 2011, the entire contents of which are incorporated into this specification by reference.

The invention claimed is:

1. A fuel cell system with a fuel cell configured to receive a supply of an anode gas and a cathode gas and generate power, the fuel cell system comprising:
a computer programmed to calculate a water content of the fuel cell;
calculate an internal impedance of the fuel cell;
calculate a fuel cell temperature at a start of the system, based on the water content of the fuel cell at a time of a previous stop of the system and the internal impedance of the fuel cell at the start of the system, and
the water content being calculated by the water content calculation unit, the internal impedance being calculated by the internal impedance calculation unit, and calculate the fuel cell temperature at the start of the system, from the water content at the time of the previous stop of the system and the internal impedance at the start of the system, by using a characteristic diagram that defines relationships of the water content, the internal impedance, and the fuel cell temperature.

2. The fuel cell system according to claim 1, further comprising:
a cooling water temperature sensor configured to detect a temperature of cooling water for cooling the fuel cell, wherein the computer is programmed to calculate the water content of the fuel cell based on the temperature of cooling water detected by the cooling water temperature sensor at a stop of the system and the internal impedance calculated by the computer at the stop of the system.

3. The fuel cell system according to claim 1, wherein the computer is programmed to cause a drying operation to be executed so as to decrease the water content of the fuel cell before the system is to be stopped.

4. The fuel cell system according to claim 1, wherein:
the anode gas to be supplied to the fuel cell is hydrogen;
the computer is programmed to determine whether a low hydrogen concentration state in which a concentration of hydrogen in the fuel cell is lower than a predetermined value is assumed or not, at the start of the system; and
the computer is programmed to, when the fuel cell is assumed to be in the low hydrogen concentration state, calculate the fuel cell temperature at the start of the system based on the water content of the fuel cell at the time of the previous stop of the system and the internal impedance of the fuel cell at the start of the system, the internal impedance being calculated before hydrogen is supplied to the fuel cell.

5. The fuel cell system according to claim 4, wherein the computer is programmed to, when the fuel cell is not assumed to be in the low hydrogen concentration state, calculate the fuel cell temperature based on the water content of the fuel cell at the time of the previous stop of the system and the internal impedance of the fuel cell at the start of the system, the internal impedance being calculated after hydrogen is supplied to the fuel cell.

6. The fuel cell system according to claim 4, wherein:
the computer is programmed to calculate the internal impedance of the fuel cell and a phase delay of an output voltage with respect to an output current based on the output current and the output voltage of the fuel cell when an AC current of a predetermined frequency is superimposed on the fuel cell; and the computer is programmed to determine whether or not the fuel cell is assumed to be in the low hydrogen concentration state based on the phase delay at the start of the system.

7. The fuel cell system according to claim 4, wherein the unit computer is programmed to determine whether or not the fuel cell is assumed to be in the low hydrogen concentration state based on an output voltage of the fuel cell at the start of the system.

8. The fuel cell system according to claim 1, wherein the computer is programmed to judge whether or not a vehicle is in a state in which driving is possible, based on the fuel cell temperature at the start of the system.

9. The fuel cell system according to claim 1, wherein the computer is programmed to judge whether or not it is necessary to warm up the fuel cell, based on the fuel cell temperature at the start of the system.

10. A method of controlling a fuel cell system, comprising calculating the fuel cell temperature of the fuel cell according to claim 1.

11. A method of controlling a fuel cell system with a fuel cell configured to receive a supply of an anode gas and a cathode gas and generate power, the method comprising:

calculating, by a computer, a water content of the fuel cell;

calculating, by the computer, an internal impedance of the fuel cell;

calculating a fuel cell temperature at a start of the system, based on the calculated water content of the fuel cell at a time of a previous stop of the system and the calculated internal impedance of the fuel cell at the start of the system, and calculating the fuel cell temperature at the start of the system, from the water content at the time of the previous stop of the system and the internal impedance at the start of the system, by using a characteristic diagram that defines relationships of the water content, the internal impedance, and the fuel cell temperature.

* * * * *